(12) United States Patent
Cullen

(10) Patent No.: US 6,339,698 B1
(45) Date of Patent: Jan. 15, 2002

(54) COMMUNICATIONS SYSTEM WITH CONTROLLED SELECTIVE MEASURING OF TRAFFIC PROPERTIES

(75) Inventor: John Michael Cullen, Suffolk (GB)

(73) Assignee: British Telecommunications public limited company, London (GB)

(*) Notice: Subject to any disclaimer, the term of this patent is extended or adjusted under 35 U.S.C. 154(b) by 0 days.

(21) Appl. No.: 08/586,716

(22) PCT Filed: Aug. 1, 1994

(86) PCT No.: PCT/GB94/01687

§ 371 Date: Mar. 29, 1996

§ 102(e) Date: Mar. 29, 1996

(87) PCT Pub. No.: WO95/04419

PCT Pub. Date: Feb. 9, 1995

(30) Foreign Application Priority Data

Jul. 30, 1993 (EP) .............................................. 93306048

(51) Int. Cl.[7] .............................................. H04B 17/00
(52) U.S. Cl. ...................... 455/67.1; 455/426
(58) Field of Search .............................. 455/67.1, 67.3, 455/67.4, 67.5, 67.6, 56.1, 33.1, 33.2, 9, 53.1; 379/59, 60

(56) References Cited

U.S. PATENT DOCUMENTS

| | | | |
|---|---|---|---|
| 3,845,472 A | 10/1974 | Buchanan et al. | 340/163 |
| 4,727,359 A | 2/1988 | Yuchi et al. | 340/518 |
| 4,829,558 A * | 5/1989 | Welsh | 372/92 |
| 5,023,900 A * | 6/1991 | Loe et al. | 379/32 |

FOREIGN PATENT DOCUMENTS

| | | |
|---|---|---|
| EP | 0091144 | 10/1983 |
| EP | 0332818 | 9/1989 |
| JP | 5761350 * | 4/1982 |

OTHER PUBLICATIONS

Zoffinger et al., "Traffic Monitor System Boosts CO Performance", Telephone Engineer and Management, vol. 78, No. 1, Jan. 1974, USA, pp. 84–87.

Till, "Modem Manager Monitors A Variety of Devices", Electronic Design, vol. 37, No 13, Jun.1989, USA, pp. 123–124.

* cited by examiner

Primary Examiner—Lee Nguyen
(74) Attorney, Agent, or Firm—Nixon 7 Vanderhye P.C.

(57) ABSTRACT

A communications system includes a plurality of functional elements and measures properties of the functional elements. A processing function element controls the measuring and receives data from the measuring step. Communications links the central processor with the measuring element and the processing element is arranged to selectively instruct the measuring element to transmit selected data to the processing element.

24 Claims, 5 Drawing Sheets

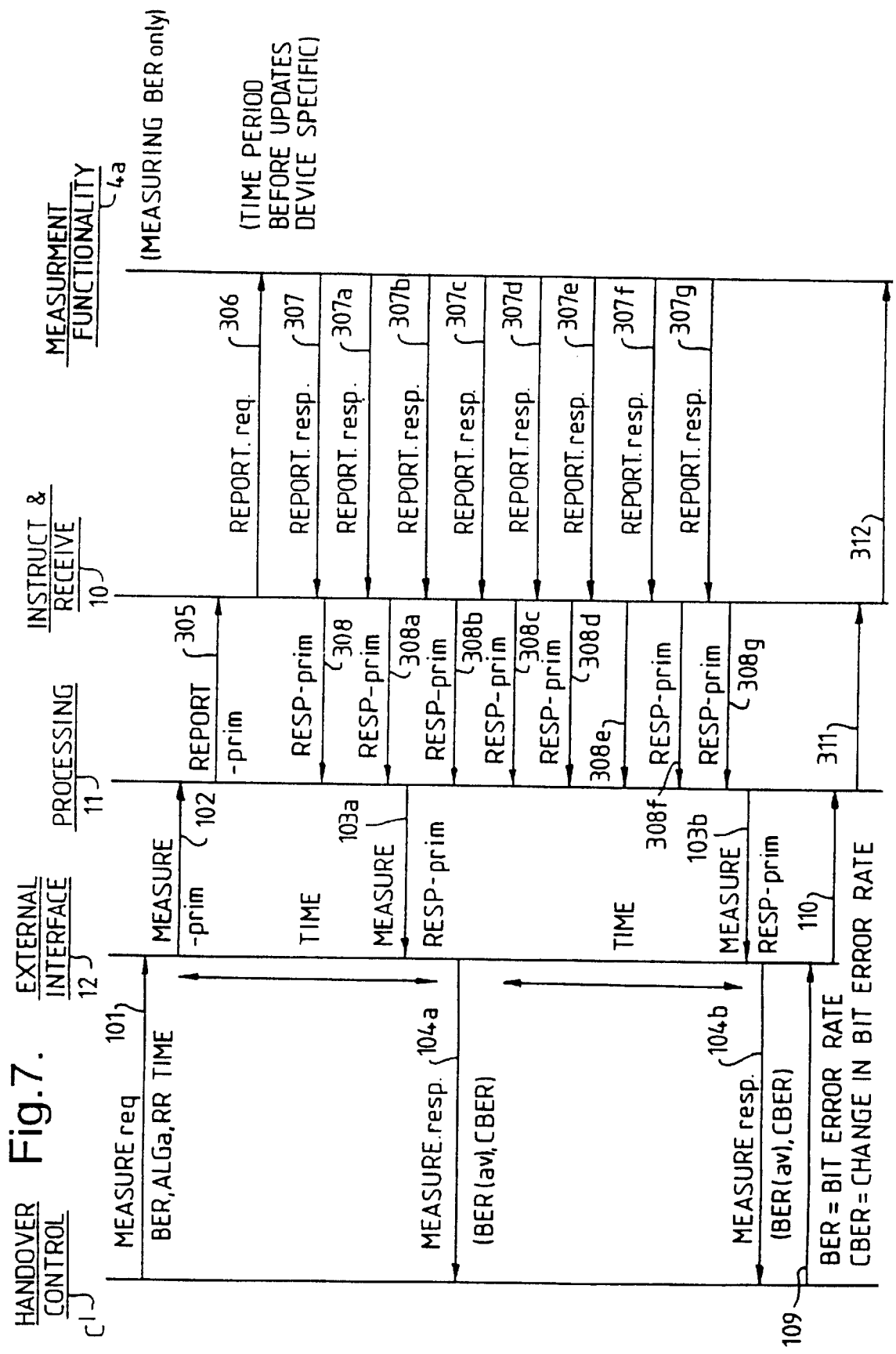

COMMUNICATIONS SYSTEM WITH CONTROLLED SELECTIVE MEASURING OF TRAFFIC PROPERTIES

BACKGROUND OF THE INVENTION

1. Field of the Invention

This invention relates to the operation, monitoring and control of a communications system. It is of particular relevance to the operation of telecommunications networks, but is not limited to such systems.

2. Related Art

In this specification the term 'functional element' is used to define an element of a communications system which performs some function, e.g. a switching or monitoring function, to the system itself, as distinct from an 'application process element' which controls a number of "Functional elements" to achieve a high level function, usually requiring concerted action from several functional elements. This high-level function may be a network application such as a handover process in a mobile radio system.

In a telecommunications network the functional elements of the system are widely distributed. For example, switching functionality is required at nodes throughout the system. However, in conventional telecommunications networks application process control is concentrated, requiring a large signalling load to be carried over the telecommunications network. Despite the distributed nature of the system all elements of the network which interact must have compatible signalling formats. This is a particular problem in a cellular radio network, where mobile units made by a number of different manufacturers can turn up anywhere in the system and have to interact consistently with whichever fixed part of the network they happen to have established communication with. In such a network it is difficult to arrange for enhancement or improvements, because of the need for all signalling formats to remain compatible.

Further problems arise in known systems because of the need for measurements of network conditions e.g. link performance to be made, and the results transmitted to a control centre, either continuously or discontinuously depending on the nature of the measurements to be made and the purpose for which they are required. This places an additional signalling overhead on the network. Many measurements are often only required in specific operating circumstances. It is therefore wasteful of signalling capacity for all possible data to be transmitted when much of it is redundant. The limited signalling capacity and the number of different measurements to be made also reduce the resolution of the measurement and/or the sampling rate that can be supported.

According to a first aspect of the invention a communications system comprises a plurality of measuring means for measuring properties of the traffic carried by the communications system, and a data processing element for controlling the measuring means and receiving data from the measuring means, wherein the data processing element is arranged to selectively instruct the measuring means to transmit selected data to the data processing element.

According to a second aspect of the invention there is provided a method of measuring properties of a distributed system at remote points in a system, the system comprising a plurality of measuring means at the points where the properties are to be measured, the method comprising the steps of controlling the measuring means, and instructing the measuring means to transmit data to a data processing element.

The points at which the measuring means and data processing elements are located can be selected according to the particular functions they are required to perform. For instance, in a cellular radio network, the measurement of radio signal quality takes place at the individual base stations, but handovers and multi-casting functions require functional elements at switching points, using data from measuring means at several sites. The data processing elements may thus be located with the process control elements.

Dedicated signalling links between the process control units and the network operating units may be provided. However, if the system being controlled is a telecommunications network, the signalling may be carried over the traffic bearer links of the network. The process control elements need not be located at a node of the bearer network. Using the telecommunications network example, process control can be located at any point in the network, and for different functions may be located at different points.

BRIEF DESCRIPTION OF THE DRAWINGS

Embodiments of the invention will now be described, by way of example and with reference to the accompanying drawings, wherein:

FIGS. 5, 6 and 7 are flow charts illustrating the data flows taking place within the embodiment of FIGS. 1 and 2.

DETAILED DESCRIPTION OF EXEMPLARY EMBODIMENTS

Figure 1:
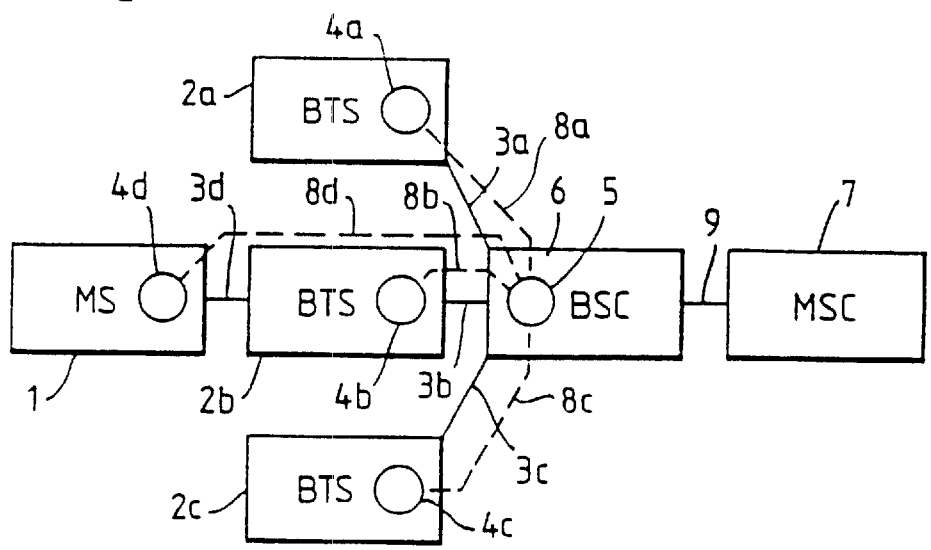
FIG. 1 shows schematically a mobile radio network in accordance with a first embodiment of the invention.
Figure 2:
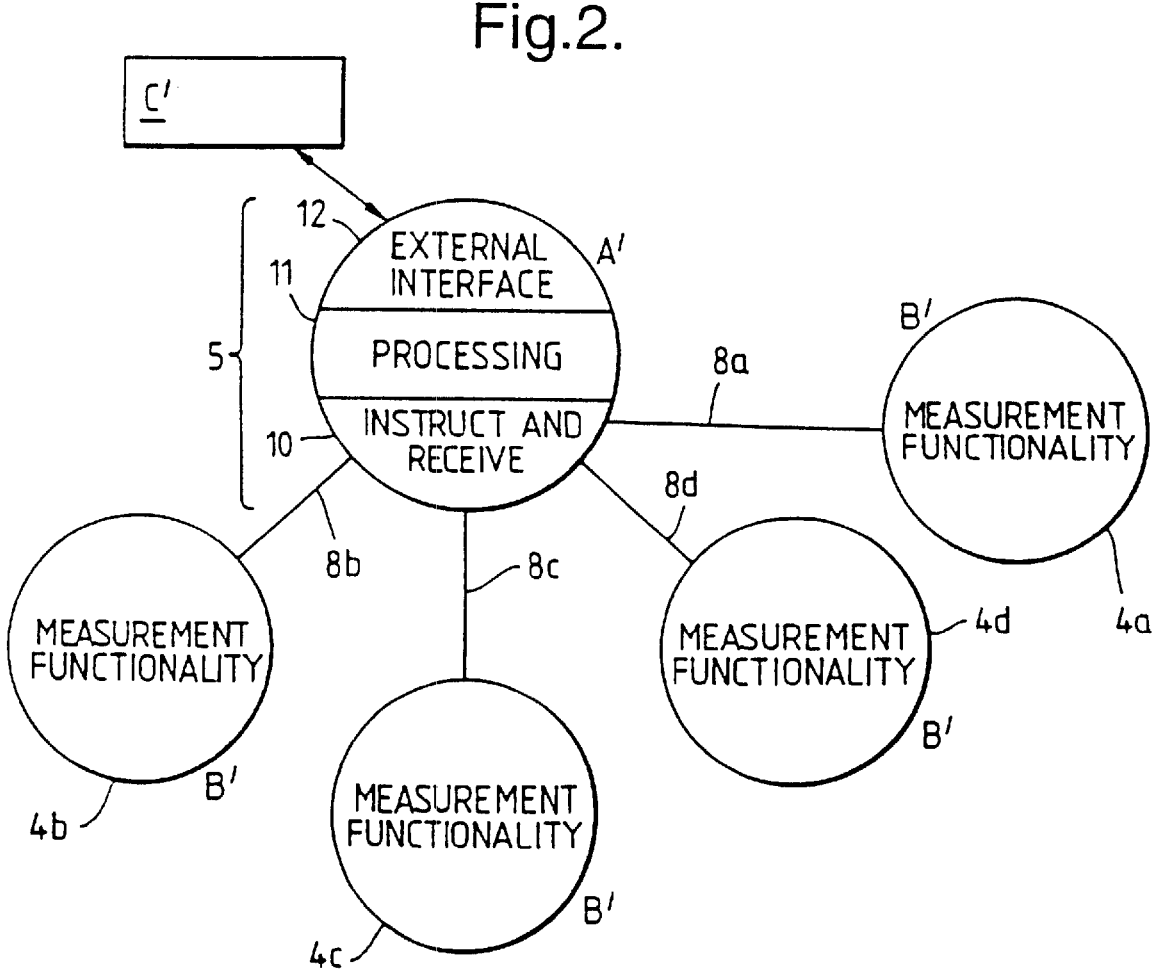
FIG. 2 shows the network of FIG. 1 in functional terms.

An embodiment of the invention, shown in FIGS. 1 and 2, is a communications system having means for collecting and processing data on the quality of bearer links in the system. In this embodiment the system is a mobile radio telecommunications network. The collected data in this particular example is to be used in the handover process of the mobile radio network.

FIG. 1 shows a simplified diagram of the mobile radio network, illustratively a cellular radio network, comprising a mobile unit 1 and three base stations 2a, 2b, 2c each having measuring equipment 4a, 4b, 4c, 4d for monitoring the quality of respective bearer links, 3a, 3b, 3c, 3d. In the case of base station 2b the bearer links 3b, 3d are actual links with the mobile unit 1 currently in operation and carrying traffic. The other two base stations 2a, 2c are potential candidate base stations for taking handover of the mobile unit 1 from base station 2b and respective links 3a, 3c are not currently carrying traffic to mobile unit 1.

The base stations 2a–2c are all connected to other parts of the network through a base site controller 6 and mobile switching centre 7.

The individual base stations 2a, 2b, 2c may be co-located, for instance to cover different sectors of a cell, and the base site controller 6 may also be co-located with them. The measuring equipment 4a, 4b, 4c, 4d in the various base stations 2a, 2b, 2c and the mobile unit 1 need not be the same, (particularly if the base stations are at different sites) so the raw data received from each device may be different in form. In particular, modern mobile networks must be capable of supporting mobile units built by a variety of manufacturers. Although the methods of measurement may differ, the properties to be measured, such as bit error rate (BER), C/I, received power level, or bit rate are similar for each unit.

The process control unit 5 is located in the base site controller 6, and is in communication with each of the measurement units 4a–4d. The necessary signalling is carried over the bearer links 3a, 3b, 3c, 3d, which also carry the telecommunications traffic for which the links have been set up. The process control unit 5 instructs the measurement units 4a, 4b, 4c, 4d to take measurements of link performance eg BER, C/I, received power level or bit rate. These units may collect data continuously, or may only do so in response to a signal from the process controller, 5.

It will be noted that data collected by unit 4d at the mobile station 1 will travel by way of one of the base stations 2b. However, the base station 2b does not process this data in any way but passes it on to process control unit 5 located in the base site controller 6. There is thus a direct logical link 8d between measurement unit 4d and process control unit 5, as well as logical links 8a, 8b, 8c between measurement units 4a, 4b, 4c and process control unit 5. The base station 2b itself also sends data collected at the base station 2b by measurement unit 4b. The process control unit 5 is connected to an application function $C^1$ e.g. a handover control function in mobile switching centre 7 or base site controller 6, which provides the application function with data.

The measurement units 4a, 4b, 4c, 4d can be configured to make different measurements according to instructions received from the processing unit 5. Such changes may be made dynamically e.g. depending on prevailing conditions, for example the type of signal e.g. voice or data being carried by the bearer, or in response to prevailing conditions elsewhere in the network, e.g. time of day/day of week.

The parameter to be measured (e.g bit error ratio, C/I, RSSI) can be selected dependant on the type of signal which is to be carried by the bearer (eg analogue/digital, different bit rates, etc).

As the measurement process control unit 5 is located in the base site controller 6, measurement collection control is performed at as low a level in the network as possible, whilst minimising the processing power in the base stations 2a–2c themselves. By locating the process control unit 5 at a localised level, the data can be compressed and selected at this level, thereby reducing the amount of signalling from and to other parts of the network.

Furthermore where, for example, the base site controller 6 includes sufficient processing to identify which of the three base stations 2a–2c has the strongest signal from the mobile unit 1, only that fact need be passed to the decision making unit (typically located in the mobile switching centre 7) determining whether a handover is to take place. Indeed, where handover is between base stations handled by the same base site controller the mobile switching centre 7 may not need to be involved at all.

The monitoring equipment 4a–4d performs the collection of bearer link quality information in the network. This equipment need only have limited functionality. Its function need only be to monitor a particular physical link and report measurements to the measurement process control unit 5.

The operation of the system of FIG. 1 will now be further described with reference to FIG. 2 which illustrates the system in functional terms. In particular measurement functionality $B^1$ corresponds to measuring equipment 4a–4d, processor function $A^1$ corresponds to process controller 5, and the application function $C^1$ corresponds to e.g. the handover function in BSC 6 and/or MSC 7.

Processor $A^1$ has three modules, as illustrated in FIG. 2: an instruct and receive module 10, a processing module 11, and an external interface module 12. Instruct and receive module 10 is in direct communication with the measurement functionality $B^1$. This module receives measurement data from the measurement functionality $B^1$, and is configured to recognise data streams as they come in and convert them into a standard format. Conversely, it also receives signals from the processing module 11 and converts them into instruction signals recognisable by the individual measuring functionalities $B^1$. The instruct and receive module 10 has a functional element which is dedicated to a respective measurement functionality to which it is connected, and which is configured to be compatible with it. The functional elements of the instruct and receive module 10 required for each measurement functionality $B^1$ may be co-located, e.g. in software. Different functional elements may be embodied in common hardware, for instance if each measurement unit 4a–4d is polled in turn by process controller 5 using time division, the instruct and receive functionality embodied in the process controller 5 has to translate in turn between the standard processing of the processing module 11 and the format required by the measuring function $B^1$. This requires the instruct and receive module 10 to be configured in each time slot for the message format used by the individual measurement functionality $B^1$. The term "element" must thus be understood to embrace any function or combination of functions by which the instruct and receive module can be implemented, and correspondingly the physical realisation of the elements, modules and units can be by any means, with parts shared or not.

The processing module 11 handles control signals from the external interface module 12 (to be discussed below), and also processes measurement parameters received in a standardised format from the instruct and receive module 10. The processing module 11 controls, through instruct and receive module 10, the measurement function $B^1$, and also performs any control actions required. In response to a request for data from the application $C^1$ received via external interface module 12, the processing module 11 sends an instruction to the instruct and receive module 10 to collect data from the individual measurement function $B^1$. These instructions are translated by the instruct and receive module 10 into the format required by the measurement functions $B^1$. The measurements having been received back at the instruct and receive module 10, and translated back into the common processing format by that module, the processing module 11 performs formatting and/or other processes such as for example an average over a given time period or a mathematical function of one or more of the parameters received from the measurement functions $B^1$. As a particular example, the processor $A^1$ may compare the signal strengths measured by the measurement functionality $B^1$ associated with (three) candidate base stations (4a–4c) from which data was requested, and return a signal to the handover application $C^1$, via the external interface 12, giving the identity of the base station 4b having the strongest signal. In this example, the absolute values of the signals are not sent via the external interface module 12 to the application $C^1$.

The external interface 12 sends data signals to and from the application $C^1$. In the case of handover determination this application $C^1$ is the network control function responsible for handover. The function itself sends signals via the external interface module 12, in a standard form, to instruct the processing module 11 to send start, or stop signals, or a request for data to measurement functions $B^1$. The network control function $C^1$ also receives data from the measurement functions $B^1$ by way of the process unit $A^1$.

The measurements may be made for a continuous period, or a single instantaneous measurement may be required. The instructions to be sent from the application $C^1$ to the process control function $A^1$ will obviously differ in these two cases. Similarly, if the result required is, for example, a time average, then the process control module 11 provides processing and storage and the time averaged result is transmitted to the measurement control application $C^1$ periodically. In these circumstances the process control module 11 includes, functionally, a data buffer to store the data while these time averages, trends, etc. are being calculated.

The network may include many different designs of switches and mobile units, each with its own measurement functions and physical realisation. The measurement control function $A^1$ provides a way of intelligently interfacing these measurement systems with one network management measurement application $C^1$. Pre-processing is performed in the processing function $A^1$, and the results of the processing of the measurement data passed to the handover application $C^1$ so that handover decisions can be made. Where the physical realisation of the processing functionality $A^1$ is located in the base stations 2a–2c the quantity of data carried by the bearer links 3a–3c is reduced.

The measurement control function may be used for other purposes than handover. For example, measurements may be required for fault monitoring, statistical analysis for future traffic planning, billing, etc. The external interface 12 is configured to respond to signals from any such application platforms.

Different measurement functions $B^1$ may be capable of making different measurements. Such differences are handled by the instruct and receive module 10 of the processing unit $A^1$ in order to provide a common data standard for the use of the network application.

In one variation of this embodiment the individual measurement functions $B^1$ have very limited functionality. They operate constantly, monitoring a property of the system. On a request from the process control function $A^1$ the current value of the data is reported back to the process control function $A^1$. The decision as to which data is passed on to the application $C^1$ is taken by the process control $A^1$ acting in response to instructions from the applications $C^1$.

Figure 5:
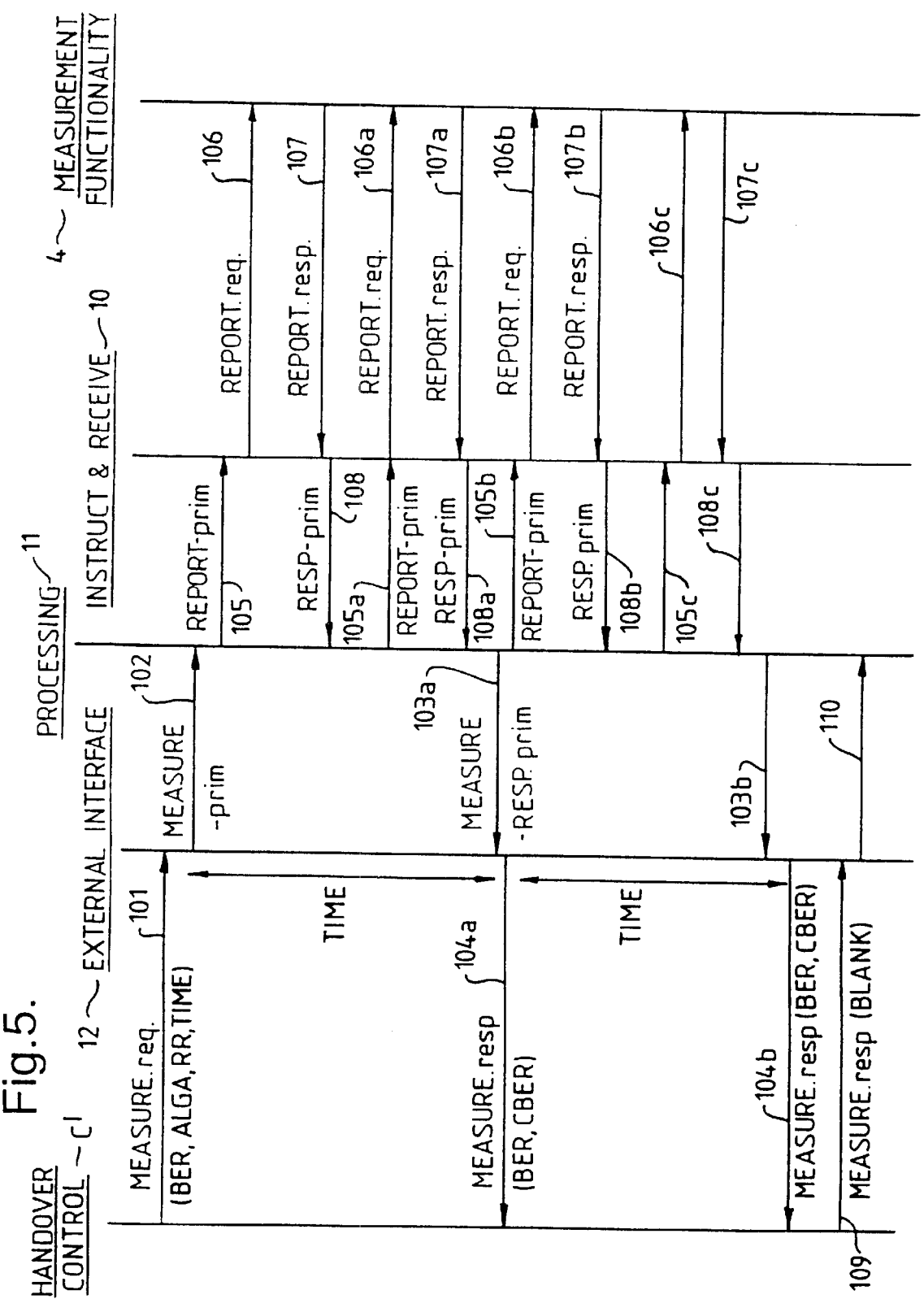
Figure 6:
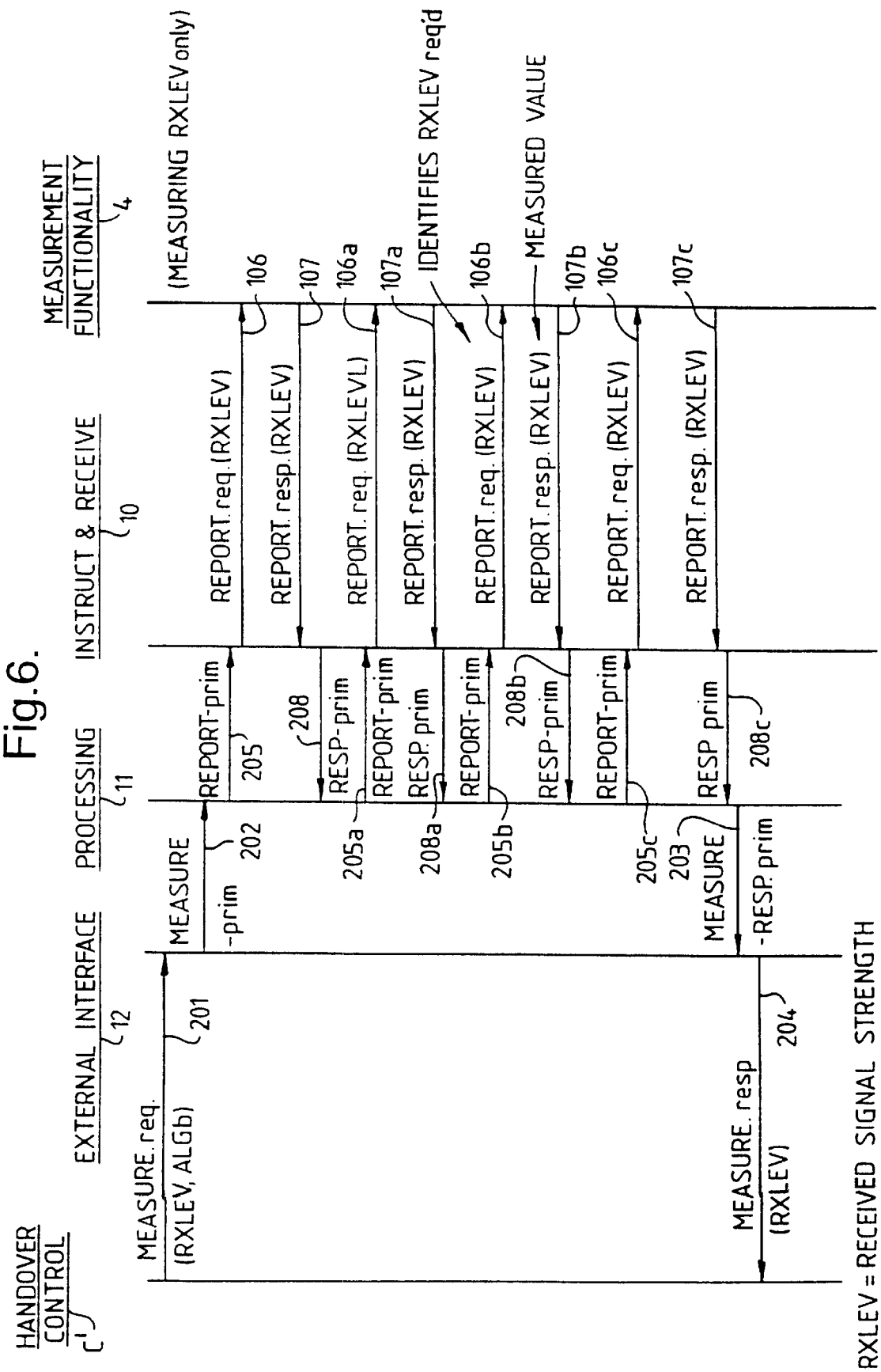

FIGS. 5, 6 and 7 are flow charts illustrating the data flows taking place within the embodiment of FIGS. 1 and 2. In this example the high-level application ($C^1$) is a handover control.

Two message formats are available to the external application $C^1$:

1) "Measure Request".

This message is passed from the handover control $C^1$ to the external interface 12 and has fields specifying:
- the parameter(s) to be measured (in this case the bit error ratio BER),
- the algorithm to be applied to measurements (either ALGA: provide an average value of the parameter and the change in that value; or ALGB: provide averaged value of the measured parameter when parameter drops below 50% original value),
- reporting method (RR=regular reports at intervals, or a null value indicating a request to provide a response when the algorithm provides a result),
- the time between measurement reports if applicable (TIME).

2) "Measure Response".

This message passes from the external interface 12 to the handover control $C^1$ and contains result parameters from the measurement algorithm in the processing block in the form specified in the request message. The response message is sent at intervals depending upon the contents of the request message.

FIG. 5 illustrates the use of the embodiment of FIGS. 1 and 2 for measurement reporting at regular intervals when the remote measurement functionality only sends out measurements when requested. The process controller 5 must therefore respond to a single request from the handover control $C^1$ for periodic data, by sending periodic requests for data to the measurement functionality 4.

The control application $C^1$, in this case the handover control application, sends a measurement request 101 asking for the Bit Error Rate (BER) to be measured. Algorithm A is to be used, in which regular reports are to be sent from the processing module 11 at time intervals of TIME between messages. The processing module is informed about what processes it has to perform by primitives 102 from the external interface module 12. The processing module 11 then operates the required algorithm, starts to gather measurement information and when ready sends the preprocessed information 103a back to the external interface 12 which in turn sends information 104a to the requesting control application $C^1$. When the processing module 11 requires information from measurement functionality 4 it issues a REPORT primitive 105, 105a containing information about what is required to be measured, to the instruct and receive module 10. The instruct and receive module 10, then sends a report request message 106 in a format that will be recognised by the remote measurement functionality 4. In this case the format will be very simple as the measurement functionality 4 is assumed to be only 'on' or 'off', measuring only BER and then returning it immediately in a Report response message 107. On receipt of this message by the instruct and receive module 10, the module issues a RESP primitive 108 to the processing module 11 carrying the measured parameter in a standard format. The processing module 11 issues further report request primitives 105a etc which are responded to in a similar manner (106a, 107a, 108a). The processing module 11 then performs Algorithm A on the data and after time TIME has elapsed sends a Measureresp primitive 103a to the external interface module 12. The external interface module 12 returns the results of the measurement process to the application $C^1$ (Handover Control in this case) in a standard format (in this case BER and the change in BER (CBER)). The processing module 11 continues performing the measurement process 105b/c, 106b/c, 107b/c, 108b/c, 103b until instructed otherwise by receipt of a primitive 110 relating to a blank Measure request 109 received by the external interface module 12.

FIG. 6 illustrates the use of the embodiment for the generation of a measurement report only when the measured parameter changes by 50%. This would be useful, for example, to provide a trigger to initiate a handover process. As in the first example the remote measurement functionality 4 only sends out measurements when requested. This illustrates how the same measurement functionality 4 can be made to supply application process control functionality $C^1$ having different requirements.

The handover control application $C^1$ sends message 201 which asks for the Received Signal Level (RXLEV) to be measured, and Algorithm B to be used. Regular reports are not required to be sent from the processing module, as indicated by the absence of the RR parameter.

The processing module 11 is informed about what processes it has to perform by primitives 202 from the external Interface module 12. The processing module 11 then operates the required algorithm, starts to gather measurement information and when ready sends the preprocessed information 203, 204 back to the requesting control application. When the processing module 11 requires information from measurement functionality 3 it issues REPORT primitives, 205, 205a, 205b, 205c, containing information about what is required to be measured, to the instruct and receive module 10. In response, the instruct and receive module 10 then sends Report request messages 106, 106a, 106b, 106c in a format that will be recognised by the remote measurement functionality 4. In this case the format will be again relatively simple in that the measurement functionality 4 is assumed to be only 'on' or 'off', measuring only BER and returning it at a set interval in a Report response message 107, 107a, 107b, 107c. On receipt of these messages by the instruct and receive module 10, the module issues RESP primitives 208, 208a, 208b, 208c, to the processing module carrying the measured parameter in a standard format. The processing module 11 performs the Algorithm B on the data and when the value of the measured parameter has changed by more than 50% the processing module 11 sends a Measureresp primitive 203 to the external interface module 12. The external interface module 12 returns the results of the measurement process to the calling application (Handover Control in this case) in a standard format (in this case RXLEV) 204.

It will be seen that handover controls $C^1$ having different measurement requirements (FIGS. 5 and 6), can nevertheless interface with the same measurement functionality 4.

FIG. 7 illustrates the use of the embodiment for measurement reporting when the remote measurement functionality sends measurements at regular intervals.

Comparison with FIG. 5 will illustrate how different measurement functionalities 4, 4a can be used to supply the same application process functionality.

As in the embodiment of FIG. 5, the handover control application, $C^1$, sends a request 101 asking for the Bit Error Rate (BER) to be measured, using Algorithm A, with regular reports to be sent from the processing module at time intervals of TIME between messages. The processing module 11 is informed about what processes it has to performs by primitives 102 from the external interface module 12. The processing module 11 then operates the required algorithm A, starts to gather measurement information and when ready sends the preprocessed information back to the requesting control application 103a, 104a, 103b, 104b. When the processing module 11 requires information from the measurement functionality 4a it issues a report primitive 305, containing information about what is required to be measured, to the instruct and receive module 10. The instruct and receive module 10 then sends a Report request message 306 in a format that will be recognised by the remote measurement functionality 4a. In this case the format will be again relatively simple in that the measurement functionality is assumed to be only 'on' or 'off', measuring only BER and returning it at a set interval in a Report response message 307, 307a to 307g (this is the difference between this example and that in FIG. 5 and serves to illustrate that different measurement functionality 4, 4a can be used to perform a task using the same measurement request 101 from handover control $C^1$ and returning the data in the same format 104a, 104b). On receipt of the messages 307 by the instruct and receive module 4a, the module issues a RESP primitive 308 to the processing module 11 carrying the measured parameter in a standard format. The processing module performs the Algorithm A on the data and after time TIME has elapsed sends a Measureresp primitive 103a, 103b to the external interface module 12. The external interface module 12 returns the results of the measurement process to the Handover Control $C^1$ in a standard format (in this case BER and the change in BER (CBER 104a, 104b)). The processing module 11 continues performing the measurement process until instructed otherwise by receipt of a primitive 110 relating to a blank Measure request 109 received by the external interface module $C^1$ as for the arrangement of FIG. 5. The processing module 11 will then issue a Close primitive 311 that will be used by the instruct and receive module to generate a measurement functionality specific close message 312 instructing the module to terminate the module's measurement collection process.

Figure 3:
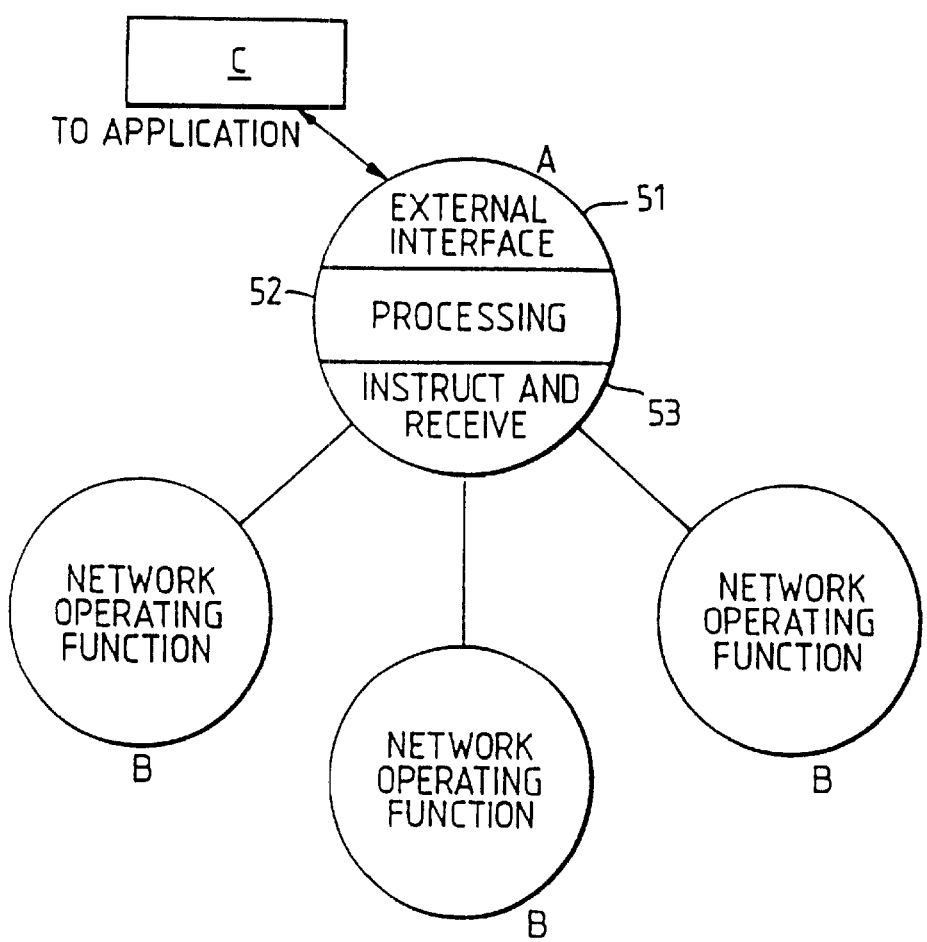
FIG. 3 is a functional representation of a system according to a second embodiment of the invention.

In the second embodiment of the invention, a communications system, shown in FIG. 3 in functional terms, comprises a telecommunications network incorporating a processor function A interconnecting functional elements in the form of network operating functions (NOFs) B, with an application C. The processor function A has three functional modules: an external interface module 51, processing module 52, and instruct and receive module 53.

In operation, processor function A relays data, in either direction, between NOFs B and application C. The application may be a network service or service element and the data may be, for example, control messages going from application C to NOF B, or measurement or status data going from NOFs B to application C.

Processor function A performs three functions. Instruct and receive module 53 sends instruction data to, and receives measurement data from, the individual network operating function elements. External interface module 51 interfaces with the application C. These two modules 51, 53 are linked by the processing module 52 which, for example, translates (a) instructions from the application C into the individual instructions for NOF B, and/or (b) data received from the NOF B into a data format suitable for the application platform C.

Although FIG. 3 has been illustrated for a single application for simplicity, there may be a plurality of applications interconnected with respective or common NOFs by respective or common processing units, as will be seen from the following description.

In processing unit A, the external interface module 51 provides a common interface to application platform C. This interface offers the application platform C a set of available commands that processing module 52 can perform independently of the interface to the network operating functions B.

The processing module 52 performs the conversion of application information data into information specific to the individual NOFs, and/or performs the conversion of NOF information into a form suitable for the application platform C.

The instruct and receive (IR) module 53 communicates with the NOFs B, and may have different interfaces to different NOF units in the network. The IR module 53 converts between primitives used by the processing module 52 and information message formats used by NOFs B.

Instead of, or in addition to, the conversion or translation described, the processing module 52 may also perform additional processing specified by application platform C. The NOFs B may take the form of functionality associated with the network, e.g. embedded software, or they may be discrete elements, units or modules e.g. monitoring elements or network control functions.

Similarly, the applications platform C may be a function or functionality embedded in the network, e.g. in a service control point or they may be embodied in a stand-alone application platform.

Figure 4:
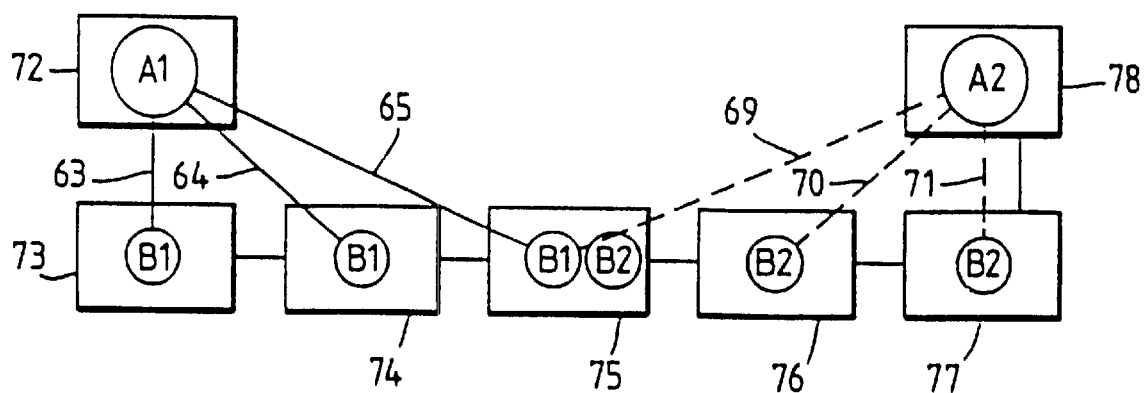
FIG. 4 is a schematic diagram of a network architecture incorporating the functionality of the system of FIG. 3.

FIG. 4 illustrates how the generalised system of FIG. 3 may be mapped to a Network Architecture, shown in this example as a fixed network. In functional terms elements A1, A2 represent process control functionality and B1, B2 represent network operating functions. Functionality scripted "1" e.g. A1, B1 represents an intelligent network element where Service Control is separated from the switching network and signalling is carried over separate links (63, 64, 65). Functionality scripted with a "2" (e.g. A2, B2) represents elements where all functionality is incorporated in the switching network which carries the signalling information to provide logical links (69, 70, 71). As can be seen from FIG. 4 both the process control functionality and the network operating functionality can be located at potentially any node in the network. These nodes (72 to 78) may be for example service control points, network management centres, switches etc. Important aspects to be noted are that:

(i) process control functionality is located in specific nodes (72, 78) throughout the network.

(ii) secondly, process control functionality for a particular application is fixed in a particular network node, eg process control A1 in node 72, but for different applications or uses of the same application can be located in different network nodes (eg process control A2 in node 78).

(iii) the network operating functions B1, B2 are located at switching network nodes 73 to 77 and are activated by the process control functionality where needed in a realtime dynamic manner. These functions are closely associated with the bearer network.

(iv) a specific use of process control functionality A1 in a particular network node can be to control a network operating function B1 at a network node 75 where there is also present another or the same network operating function B2 under the control of another process control functionality A2.

The data flows in this second embodiment are similar to those described with reference to the first embodiment and shown in FIGS. 5, 6, and 7.

What is claimed is:

1. A communications system comprising:
a plurality of measuring means for measuring properties of the traffic carried by the communications system, and
a data processing element for controlling the measuring means and receiving data from the measuring means,
wherein the data processing element is arranged to selectively instruct the measuring means to transmit selected data to the data processing element.

2. A system as in claim 1 in which:
the measuring means are re-configurable to measure different properties under the control fo the data processing element.

3. A system as in claim 1 wherein:
the measuring means are arranged to monitor the properties that they measure continuously and to store the data until commanded by the data processing element to transmit it.

4. A system as in claim 1 wherein:
the measuring means are arranged to transmit data to the data processing element over a time period, the beginning and end of which are controlled by the data processing element, and
the data processing element is arranged to perform a computation on the data received.

5. A system as in claim 4 wherein the computation is a time average.

6. A system as in claim 4 wherein the computation is the calculation of a trend.

7. A system as in claim 4 wherein:
the data processing element is arranged to compare data received from more than one measuring means and to provide an output based on the comparison.

8. A system as in claim 1 wherein:
the system is a telecommunications network in which the measuring means determine signal quality at predetermined points within the network.

9. A system as in claim 7 wherein:
the measuring means measure the signal quality across an air interface.

10. A communications system as in claim 1, having at least one mobile unit.

11. A communications system as in claim 10, including a cellular radio system.

12. A communications system as in claim 1, including at least one fixed network termination point.

13. A method of measuring properties of the traffic of a communications system, the method comprising the steps of:
controlling selected remote means for measuring selected traffic properties, and
instructing the selected measuring means to transmit the selected data to a data processing element.

14. A method as in claim 13 wherein the properties are continuously monitored and the measurement is stored for later transmission.

15. A method as in claim 13 wherein the process includes:
instructing the measuring means to transmit data to the processing unit over a period of time, and
performing a computation on the data received over that period.

16. A method as in claim 15 wherein the computation is a time average.

17. A method as in claim 15 wherein the computation is the calculation of a trend.

18. A method as in claim 15 wherein the process includes:
a comparison of data received from more than one measuring means to provide an output based on the comparison.

19. A method as in claim 13 wherein the measuring means form part of a telecommunications system, the method comprising:
measuring received signal quality at predetermined points within the system.

20. A method as in claim 19, the method comprising:
measuring signal quality across an air interface.

21. A method as in claim 13 including:
controlling the measuring means to measure different properties in response to different control signals.

22. A method as in claim 13, wherein the distributed system includes a mobile radio system.

23. A method as in claim 22, wherein the mobile radio system is a cellular radio system.

24. A method as in claim 13 wherein the system includes at least one fixed network termination point.

* * * * *

UNITED STATES PATENT AND TRADEMARK OFFICE
CERTIFICATE OF CORRECTION

PATENT NO. : 6,339,698 B1
DATED : January 15, 2002
INVENTOR(S) : Cullen

It is certified that error appears in the above-identified patent and that said Letters Patent is hereby corrected as shown below:

Title page,
Item [74], *Attorney, Agent, or Firm* -- Nixon & Vanderhye P.C. --

Signed and Sealed this

Twenty-third Day of April, 2002

Attest:

Attesting Officer

JAMES E. ROGAN
*Director of the United States Patent and Trademark Office*